April 5, 1955  B. LIEBOWITZ  2,705,582
METHOD OF MANUFACTURE OF ONE-PIECE COLLARS
Filed Aug. 2, 1952  3 Sheets-Sheet 2
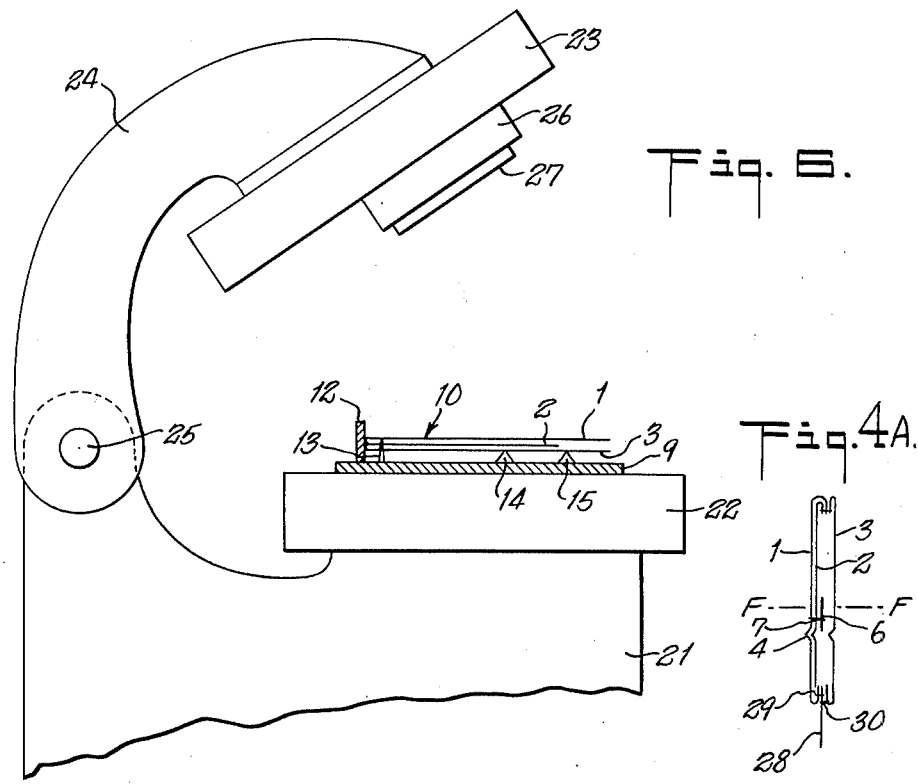
Fig. 6.
Fig. 4A.
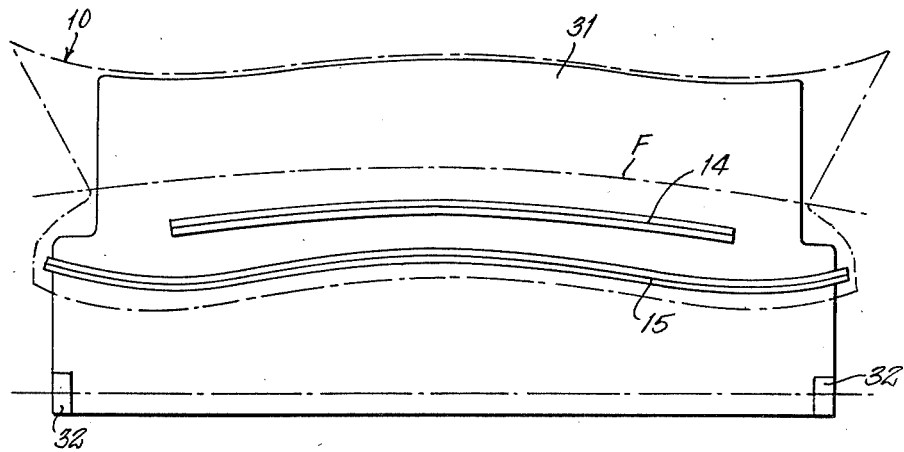
Fig. 7.
INVENTOR.
BENJAMIN LIEBOWITZ
BY
Kenyon & Kenyon
ATTORNEYS April 5, 1955     B. LIEBOWITZ     2,705,582
METHOD OF MANUFACTURE OF ONE-PIECE COLLARS
Filed Aug. 2, 1952     3 Sheets-Sheet 3
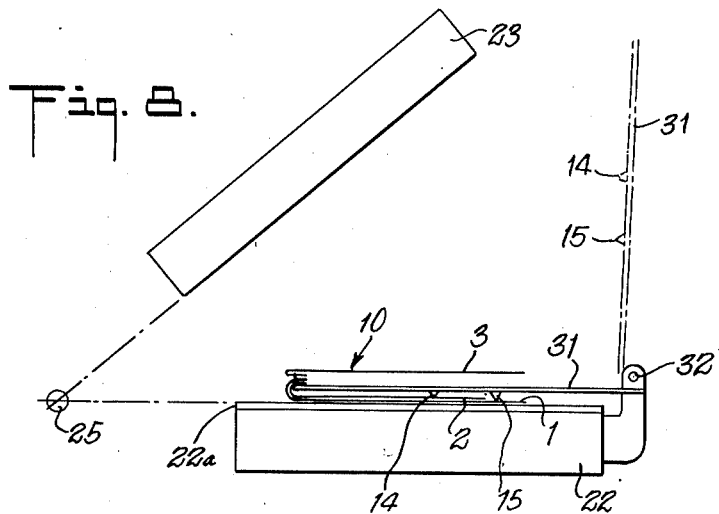
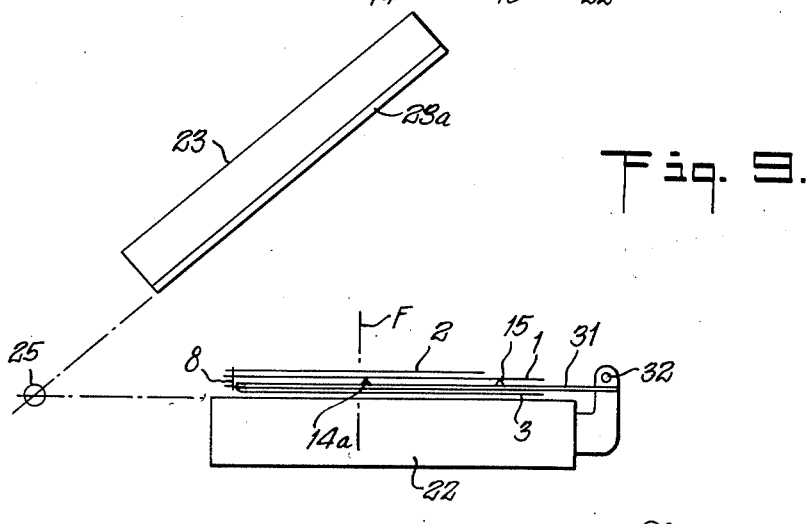
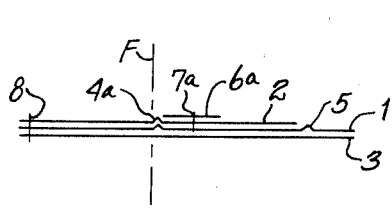
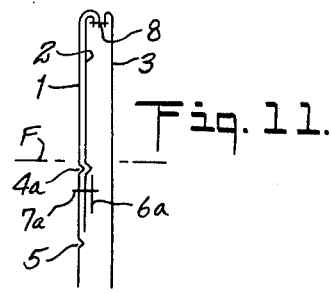
INVENTOR.
BENJAMIN LIEBOWITZ
BY Kenyon & Kenyon
ATTORNEYS

United States Patent Office 2,705,582
Patented Apr. 5, 1955

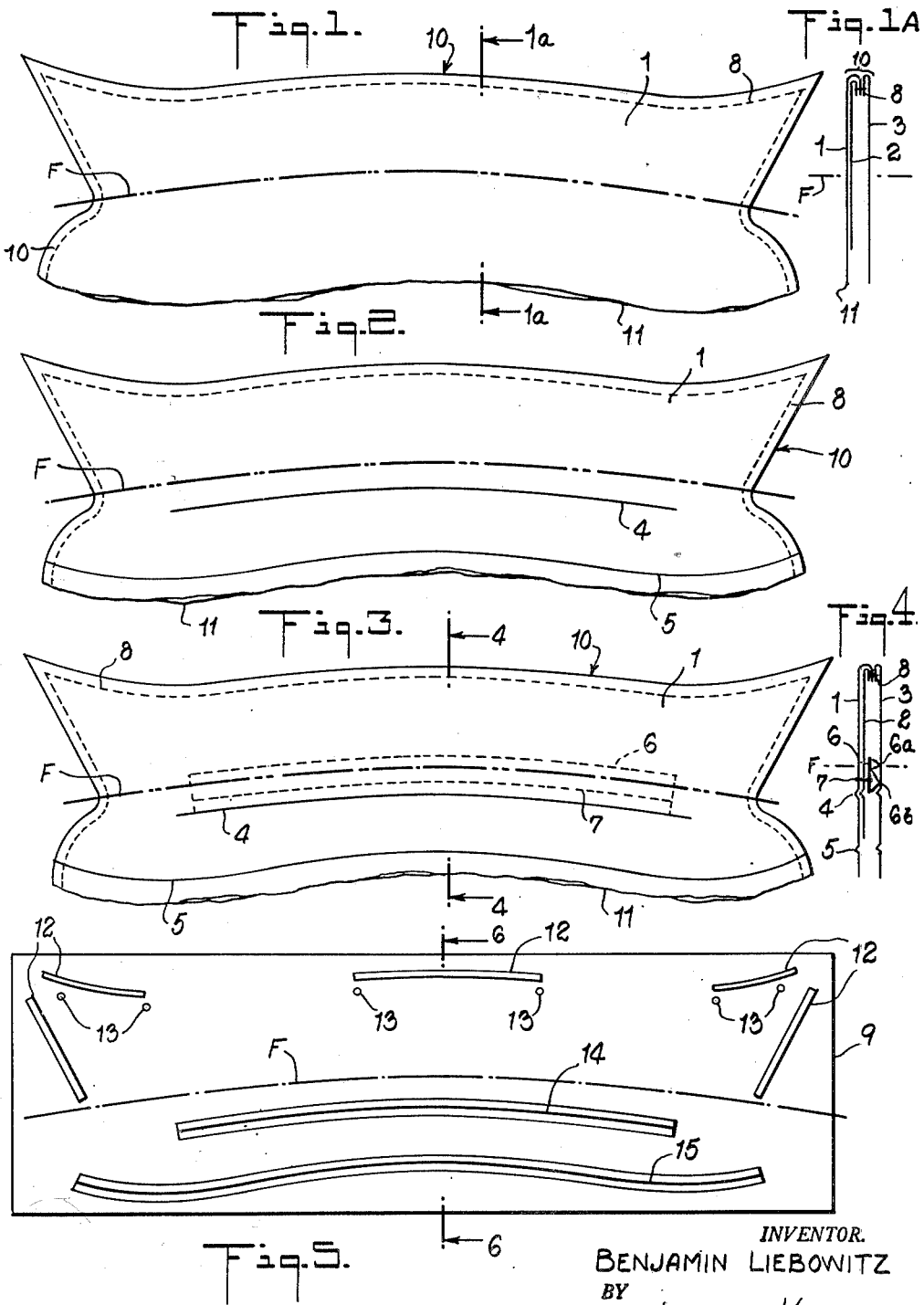

2,705,582

METHOD OF MANUFACTURE OF ONE-PIECE COLLARS

Benjamin Liebowitz, Lewisboro, N. Y., assignor to Trubenizing Process Corporation, New York, N. Y., a corporation of New York Application August 2, 1952, Serial No. 302,330

8 Claims. (Cl. 223—2)

This invention relates to the method and apparatus for the manufacture of one-piece collars.

Conventional collars such as the collars of men's dress shirts are currently made, at least in the vast majority of cases, by separately cutting and assembling the plies for the collartop or foldover portion and the plies of the band portion and by joining the two portions in the region of the foldline between the foldover and band portions of the collar along what is known as the "collar-banding seam." At the junction of these two portions along the collarbanding seam there are usually nine plies of fabric which are held together by two rows of stitches which, of necessity, have fairly high tension. In some instances there are eight plies of fabric along the collarbanding seam and in such case two spaced rows of stitching and one inside row of stitching are employed which likewise inherently are such as to be under fairly high tension. It has long been recognized that two-piece collars having such structure along the collarbanding seam tend to continue to shrink when subjected to the launderings incident to the normal use of the shirt even if the fabric of the collar was adequately preshrunk, the continued shrinkage being due to the rope-like effect along the collarbanding seam occasioned by the number of plies which are stitched together and the tension of the stitching. This is particularly true in the case of fused collars in which the shrinkage effect is often very serious.

The defect due to excessive shrinkage can be overcome by making the collar in one piece, that is, by cutting the respective collar plies which are disposed in the foldover and collarband portions of the collar from a single piece, thereby eliminating the collarbanding seam. In such case, however, it is desirable that the collar comprise some means for determining the foldline between the foldover and band portions of the collar so that in ironing the collar after laundering the foldline will be in desired position for presenting proper appearance when the collar is worn. In the initial manufacture of a collar it is important that the foldline-forming means be disposed in the collar so that the foldline determined thereby will fall at the desired location. Such foldline-forming means may be in the form of an additional ply of fabric so constituted and disposed in the finished collar as to provide discontinuity of stiffness along the foldline between the foldover and band portions of the collar. If such an additional ply of fabric is used as the foldline-forming means, then one has in the neighborhood of the foldline only four fabric plies instead of the eight or nine plies which are present in the case of a two-piece collar and, of course, there is no stitching corresponding to that which unites the eight or nine plies of a two-piece collar along the collarbanding seam. If an additional ply of fabric is used as the foldline-forming means comprised in a one-piece collar the precision of ordinary methods for making a one-piece collar is inadequate because the location of the foldline as determined by the foldline-forming means will vary entirely too much from its intended position in the collar if any of the known methods in the art are employed.

In my co-pending applications Serial No. 79,758, filed March 5, 1949, Serial No. 140,245 filed January 24, 1950 which has resulted in Patent No. 2,639,842, and Serial No. 140,246 filed January 24, 1950, which has resulted in Patent No. 2,639,843, I have disclosed methods and apparatus for the manufacture of one-piece collars which entirely eliminate the aforesaid difficulties and in fact achieve a degree of precision in collar making which had theretofore been practically impossible not only as regards the location of the foldline but also in other respects as well. However, the methods described in my aforesaid prior applications require a substantial amount of special machinery. One of the principal objects of my present invention is to provide simplified methods and apparatus for the manufacture of one-piece collars with much greater precision than that possible using prior methods and apparatus and to reduce substantially the cost of the apparatus requirements.

Features of this invention relate to method and apparatus whereby after the fabric plies of a one-piece collar have been assembled and run in the usual way along the portion thereof that constitutes the foldover portion of the collar, the run assembly is subjected to an operation which produces a crease in at least one of the collar plies that is accurately located in predetermined spaced relation relative to contours of the run assembly along the running stitch as will be described and illustrated more in detail hereinbelow. The crease that is produced is used as a fiducial mark in subsequent steps in the completion of the collar whereby the desired dimensional precision of the finished collar is obtained. A crease which is thus accurately located after the collar plies have been run may be utilized as a fiducial mark for the purpose of determining the location of the foldline between the foldover and band portions of the collar. Moreover, by producing such an accurately located crease in the region along and adjacent the bottom of the collarband portion of the run assembly such crease may be used as a fiducial mark in accurately locating the bottom edge of the collarband portion of the finished collar. Preferably two such creases are formed in accurately located position so that in the finished collar both the foldline between the foldover and band portions of the collar and the bottom edge of the collarband portion of the collar are accurately located with respect to the contours of the foldover portion of the collar and with respect to each other.

For the purpose of determining the location of the foldline between the foldover and band portions of the collar the foldline-forming means is in the form of a preformed strip and it is accurately positioned in the assembly using an accurately located crease previously formed in the run assembly as a fiducial mark. The preformed strip during the manufacture of the collar is positioned so that one edge thereof falls along the crease and by such use of the crease by the operator as a fiducial mark the preformed strip of foldline-forming material can be located in and attached to the collar assembly with a relatively high degree of precision. The strip of foldline-forming material when thus accurately located in a collar assembly is such that it provides discontinuity of stiffness in the finished collar which determines the location of the foldline between the foldover and band portions of the collar. Preferably the fiducial crease which is used for the purpose of accurately locating the preformed strip of foldline-forming material is disposed in the region of the collarband portion of the assembly in substantially spaced relation to the desired location of the foldline. In such case the strip of foldline-forming material is such that it is effective to determine the foldline in the finished collar along and adjacent the edge of the strip remote to the edge that is located so as to fall along the fiducial crease and the strip is formed to a predetermined width such that when so positioned in relation to the fiducial crease the foldline will be at the desired location between the foldover and band portions of the collar. Alternatively the fiducial crease may be disposed at or substantially at the desired location of the foldline between the foldover and band portions of the collar and the preformed strip of foldline-forming material may be disposed with an edge thereof along the crease. In such case it is the edge of the strip of foldline-forming material disposed along the crease which serves to provide the discontinuity of stiffness that determines the location of the foldline in the finished collar.

When a crease is formed along and adjacent to the bottom of a ply so as to be along and adjacent the bottom of the collarband portion of the run assembly such crease is available for use as a fiducial mark in forming the bottom edge of the collarband and by locating such crease in accurately predetermined spaced relation to the contours of the run assembly along the running stitch improved precision is afforded as regards the location of the bottom edge of the collarband in a finished collar in relation to the contours of the foldover portion thereof along the running stitch. Moreover, when a crease is also formed and used as a fiducial mark for accurately locating the foldline between the band and foldover portions of the collar both the foldline and the bottom edge of the collarband are accurately located respective to the contours of the foldover portion of the collar and with respect to each other.

The crease-forming step in any case is performed after the assembled collar plies have been run along and adjacent the portion thereof which constitutes at least the foldover portion of the finished collar. However, as will be described and illustrated more in detail below, the crease-forming step may be performed either before or after the run assembly has been turned. In either case contours of the run assembly as essentially determined by the running stitch are caused to cooperate with gauging means presenting a gauging surface that is in predetermined spaced relation with respect to the crease-forming means. The result is that whether the creasing step is performed before or after turning the run assembly, the crease or creases used for the fiducial purposes hereinabove described are accurately located so that in the finished collar the foldline or the bottom edge of the collarband or both are in the desired predetermined spaced relationship to the contours of the foldover portion of the collar. It is regarded as preferable to turn the run assembly prior to the crease-forming step and in such case the preformed strip of foldline-forming material can readily be inserted between the plies of the run and turned assembly with an edge thereof along the fiducial crease and the strip as so accurately positioned can be attached as an integral part of the assembly. When the crease-forming step is performed prior to turning the strip of preformed foldline-forming material can be deposited on an external ply with an edge thereof along the crease for attachment as an integral part of the assembly and thereafter upon turning the assembly the preformed strip of foldline-forming material will be caused to become disposed at an interior interface of the assembly in desired accurately located position.

Further objects, features and advantages of this invention will be apparent from the following description of certain illustrative embodiments and methods of practicing this invention in connection with the accompanying drawings, wherein Fig. 1 is a plan view of the assembled plies of a one-piece collar after the assembled plies have been run and turned;

Fig. 1A is a schematic cross section taken on the line 1A—1A of Fig. 1;

Fig. 2 is a plan view of the run and turned assembly of collar plies shown in Fig. 1 after certain creasing operations have been performed to produce creases therein in accordance with the present invention;

Fig. 3 is a plan view of the run and turned assembly shown in Figs. 1 and 2 which comprise a foldline-forming strip after the strip has been secured in place so that the collar is ready to be set onto a shirt;

Fig. 4 is a schematic cross section taken on the line 4—4 of Fig. 3;

Fig. 4A is a schematic cross section similar to Fig. 4 except that the bottom edge of the collarband portion of the collar has been placed in the form as, for example, when the collar has been set onto the fabric of a shirt;

Fig. 5 is a plan view of gauging and crease-forming means embodying and adapted for forming the creases as shown in Figs. 2 and 3 according to this invention;

Fig. 6 is a side elevational view of a pressing machine in connection with which the gauging and creasing means of Fig. 5 is shown in section as taken on the line 6—6 of Fig. 5;

Fig. 7 is a plan view of alternative gauging and creasing means which may be employed according to this invention;

Fig. 8 is a side elevation of the gauging and creasing means shown in Fig. 7 as disposed in operative relation with respect to schematically shown pressing elements of a pressing machine;

Fig. 9 is similar to Fig. 8 except that alternative gauging and creasing means is shown which is adapted for performing the gauging and creasing operations prior to turning the run assembly;

Fig. 10 is a schematic cross section of the plies of a run collar assembly showing the location of the creases formed therein when using the apparatus shown in Fig. 9 and showing a strip of foldline-forming material attached to the upper surface thereof, and Fig. 11 is a schematic cross section of the elements of the assembly shown in Fig. 10 after the plies of the assembly have been turned along the running stitch.

A typical run and turned assembly of collar plies for a one-piece collar is shown in Figs. 1 and 1A. The collar assembly as a whole is indicated generally by the reference character 10. In the assembly 1 is the face ply of the collar, 2 is the lining ply and 3 is the back ply. The run and turned assembly is made according to conventional practice. The individual plies are cut to desired dimensions and are assembled with the lining ply 2 on the outside. After the plies have been assembled the assembly is run along and adjacent the margin of at least the portion thereof that constitutes the foldover portion of the collar to stitch the plies together along the running stich 8. Thereafer the plies are turned with flexure of the plies along the running stitch so as to bring the lining ply 2 between the face ply 1 and the back ply 3 as shown in Fig. 1A. While the running stitch is not visible on the exterior of the run and turned assembly its location is shown in Fig. 1 by the dash line 8. In Figs. 1 and 1A as well as in other figures the location or intended location of the foldline is indicated by the dot and dash line to which the symbol "F" is applied. The location of this foldline in relation to the balance of the collar is the fundamental design basis for the collar.

According to this invention foldline-forming means is applied to the run or to the run and turned collar assembly by steps which result in the foldline determined by the foldline-forming means becoming accurately located in the desired position along the foldline F. The foldline-forming means is preferably in the form of a preformed strip of fabric which in the finished collar provides discontinuity of stiffness along and adjacent an edge thereof that determines the location of the foldline. Foldline-forming fabric strips which may be advantageously used in the practice of this invention are disclosed in my co-pending applications Serial No. 153,050 filed March 31, 1950, which has resulted in Patent No. 2,639,433, and Serial No. 175,269 filed July 21, 1950, which has resulted in Patent No. 2,639,434. In these applications a fabric strip or tape is disclosed, the body portion of which is intended to be disposed in the collarband portion of the collar and when so disposed has stiffening effect on the collarband portion of the collar immediately bordering the desired location of the foldline. A narrow marginal portion of the strip includes a zone falling along the foldline which exercises a softening effect so that along the foldline discontinuity of stiffness is provided in a narrow zone which determines the location of the foldline. Alternatively such foldline-forming means in the form of a preformed strip may be provided by other means as, for example, in the case of a stiffening strip which is placed entirely in the collarband with one edge disposed substantially along the intended location of the foldline. For purposes of specific illustration in connection with Figs. 3, 4 and 4A a strip of foldline-forming material is shown in the form of a preformed tape of the type disclosed in my aforesaid co-pending application Serial No. 153,050 (Patent No. 2,639,433). This preformed tape comprises warp yarns composed of an activatable adhesive material such as cellulose acetate. These warp yarns of activatable adhesive material are disposed in a special manner in the tape so that in the finished collar desired discontinuity of stiffness will be provided along and adjacent one edge of the tape. Starting at this edge of the tape there are a few (e. g., one to three ends) of a cellulose acetate yarn which may, for example, be 300 denier each. Adjoining these yarns there is a series of warp yarns of very light cotton or viscose to make a narrow zone, e. g., of the order of $3/16$ inch in width, which is of inherently more flexible structure as compared with the other portions of the tape and at which there is no adhesive material. Adjoining this zone there are a few, as for example two ends, of the cellulose acetate yarns which again may be 300 denier. The balance of the tape consists, for example, of a sequence of repeats each comprising two ends of cotton and one end of cellulose acetate yarn. The whole warp structure of the tape is woven into a ribbon by means of a weft of ordinary cotton or viscose yarns. When the tape having such structure is incorporated in a collar with the body portion thereof in the collarband and with the narrow adhesive-free zone having the inherently more flexible structure disposed along the intended location of the foldline, discontinuity of stiffness in the finished collar is provided along this zone which serves to determine the location of the foldline. The function of such a tape in determining the location of the foldline is more fully described in my aforesaid application Serial No. 153,050 (Patent No. 2,639,433).

The practice of this invention will first be illustrated in connection with the accurate location of a preformed strip or tape of foldline-forming material in an assembly of collar plies which has been run and turned by utilization of a fiducial crease which is formed in at least one of the collar plies before the tape or strip is attached to the assembly, the fiducial crease being accurately located with respect to contours of the run and turned assembly as essentially determined by the running stitch. Such accurate location of the fiducial crease can be accomplished by formation of the crease by means of a creasing edge which is in predetermined spaced relation to the gauging surface of gauging means adapted for the maintenance of the run and turned assembly in gauged relation thereto. Since the contour of the foldover or collartop portion of the run and turned assembly and of the band ends is already determined by the running and turning operations the gauging operation is performed by conforming the contour of the run portion of the run and turned assembly with the gauging surface of the gauging means. Either the external contour or the internal contour may be utilized for the contour of the run portion of the run and turned assembly, whether external or internal, is essentially determined by the running stitch as the result of the running and turning operation. Ordinarily the gauging surface of the gauging means is caused to conform with contours of the assembly as essentially determined by the running stitch in the region of the collartop or foldover portion of the assembly. However, alternatively or additionally the gauging surface of the gauging means may be caused to conform with the contour of the run assembly along the band ends whose contours may also be determined by the stitching and turning operations.

It will be understood that the contour of the bottom edge of the collarband portion of the assembly where it is to be set on the shirt is very ill defined as a result of the conventional running and turning operations and in fact it is this poor definition of the bottom edge of the collar-band portion of the assembly which is largely responsible for making the manufacture of one-piece collars by conventional methods impractical. This ill defined bottom edge is indicated by the reference character 11. It is an important feature of this invention that notwithstanding the ill defined nature of the bottom of the collarband portion of the collar method steps are afforded whereby the bottom edge of the collarband after its formation in the finished collar may be accurately shaped and located. While such steps for accurately shaping and positioning the bottom edge of the band portion of the collar may be separately practiced according to this invention it is a further advantage of this invention that the accurate determination both of the bottom edge of the band portion of the collar and of the location of a preformed strip of foldline-forming material can be accomplished as part of the common operation.

As aforesaid according to this invention the accurate positioning of the preformed foldline-forming strip or tape and the accurate location of the bottom of the collarband to the collar is accomplished by the formation of fiducial creases in the run and turned assembly. These fiducial creases are accurately located in predetermined spaced relation with respect to the contours of the foldover portion of the assembly as determined by the running stitch and illustrative method and apparatus are hereinafter described whereby such accurate positioning of the fiducial creases may be effected. In Fig. 2 the fiducial crease for determining the position of the foldline-forming tape is shown at 4 and the crease for determining the bottom edge of the collarband is shown at 5.

After the creases 4 and 5 have been formed the preformed foldline-forming strip or tape may be incorporated in the assembly as by turning back the back ply 3 of the assembly so as to expose the crease which has been made in the lining ply. Referring now to Figs. 3, 4 and 4A the foldline-forming strip or tape 6 is shown as disposed with one edge along the crease 4. It is to be noted that the crease 4 is in the collarband portion of the assembly in substantially spaced and parallel relation to the desired location of the foldline F. After the strip or tape 6 is placed in position it can then be secured to the lining ply as by the stitching 7 which sews the strip to the lining ply and to the face ply. The essence of the situation is that the positioning and stitching operations can be readily performed with a considerable degree of precision so that the strip or tape 6 is attached as an integral part of the assembly with the bottom edge thereof falling on the crease 4 within close tolerances. As above mentioned the strip or tape is such that the body portion thereof has a stiffening effect on the portion of the collarband in which it is located and comprises a marginal portion opposite the edge disposed along the crease 4 which provides discontinuity of stiffness in the finished collar for determining a foldline. The body portion of the tape which has the stiffening effect is indicated at 6b in Fig. 4 and the marginal portion which determines the location of the foldline is indicated in this figure at 6a. In the embodiment shown the marginal portion of the strip is of the aforesaid construction whereby the foldline that is determined thereby falls along the approximate center of the marginal portion 6a. Since the distance from the bottom edge of the tape to the center of the zone 6a which determines the location of the foldline in the collar is quite accurately predetermined in the manufacture of the tape the result is that the position of the foldline F becomes accurately located with reference to the contours of the foldover or collartop portion of the collar inasmuch as the crease 4 is in accurately predetermined spaced relationship to these contours. In this way the position of the foldline in the finished collar may be determined with much higher accuracy than is possible according to conventional methods.

It is also an important advantage of this invention that the location of the bottom edge of the collarband of the finished collar is determined by the crease 5. Since this crease 5 is accurately positioned with respect to the contours of the foldover or collartop portion of the collar, the bottom edge of the band portion of the finished collar will likewise be accurately located with respect to these contours. Moreover, when the creases 4 and 5 are both formed in the collar assembly the bottom edge of the finished collar as formed along the crease 5 is accurately positioned with respect to the foldline F. After the formation of crease 5 the ill defined edge may be trimmed according to practices which are conventionally employed at least in some factories. In Fig. 4A the bottom edge of the collarband is shown after the ill defined edges (trimmed or not, as the case may be) have been turned under in the usual way but using the crease 5 as a fiducial mark according to this invention. The bottom edge of the collarband may be stitched to the fabric 28 of a shirt as by the stitching 29 and 30. Alternatively if the collar is of the detached type the fabric 29 is not present and the bottom edge of the collarband may be formed by stitching together the turned under plies using the crease 5 as a fiducial mark. In either case the bottom edge of the collarband is located with much greater precision than is possible in connection with conventional methods.

The foldline-forming strip provides discontinuity in stiffness in the finished collar so as to determine the location of the foldline between the foldover and band portions of the collar. The foldline-forming strip or tape which has been described hereinabove by way of illustration is especially suited for incorporation in a collar of the fused type. Thus, referring to Fig. 4 the lining ply 2 may carry a latent activatable adhesive material such as oven in yarns of cellulose acetate or an adhesive applied as a coating which is adapted to become fused both to the face ply and to the back ply except where the tape 6 is interposed between the lining ply and back ply. In such case a tape having the construction above described for purposes of illustration will adhere to the lining ply and to the back ply along each edge and in the body portion thereof, which body portion is indicated at 6b in Fig. 4. The region of the tape which is of inherently more flexible construction and does not comprise any adhesive yarns and which is located at the approximate center of the region 6a of Fig. 4 along the desired location of the foldline F will not adhere to the back ply 3 and due to this fact as well as the more inherent flexible construction of the tape in this foldline-forming zone there will be discontinuity of stiffness in the finished fused collar along the foldline F. Such discontinuity of stiffness can be enhanced by preventing the foldline-forming zone of the tape from adhering to the lining ply 2 as by coating the surface of the foldline-forming zone of the tape which faces the adhesive-carrying lining ply 2 with a resist material before tthe tape is inserted. However, other preformed foldline-forming strips or tapes may be used as mentioned hereinabove. Moreover, the foldline-forming strip may be such as to provide the desired location of the foldline not only in the case of a fused collar but also in the case of a soft collar. For example, as mentioned hereinabove a strip of stiffening material which is disposed entirely in the collarband with one margin disposed along the foldline F will determine the location of the foldline in a collar whether it is of the fused type or of the soft type. More generally any foldline-forming trip may be employed which is adapted to provide discontinuity of stiffness along the foldline of the finished collar whether by way of a stiffening effect exercised in a suitable location or a softening effect exercised in a suitable location or a combined stiffening effect and softening effect. A stiffening effect can be afforded by the character of the strip itself or by its capacity to adhere to one or both of the collar plies in contact therewith. A softening effect can be afforded by the character of the strip in the zone where the softening effect is deseired or by use of such zone with a resist material to prevent fushion along the foldline in the case of a fused collar. When the strip comprises latent activatable adhesive in all or selected portions thereof such adhesive may be provided either by yarns of adhesive material comprised therein or by application of adhesive as a coating.

In Figs. 1 to 4A the lining ply is such as to be especially suitable in a collar of the fused type in that it does not extend all the way down to the bottom of the collarband portion. By thus making the lining ply of somewhat less width than the face ply and the back ply, the plies are not fusd together during the fusing step in the region of the raw edges along the bottom of the face and back plies thus facilitating the setting of the collar on a shirt after it has been fused. However, the lining ply may, if desired, have substantially the same dimensions as the face ply and the back ply either in a fused collar or in a collar of the soft type.

The method for making a collar which is herein described is in certain respects somewhat less accurate than some of the methods disclosed in my aforesaid co-pending applications. According to the method and apparatus disclosed in my aforesaid co-pending applications not only are the positions of the foldline and the bottom edge of the collar accurately determined but also the length of the collar is determined with much greater precision as compared with conventional methods. According to the invention disclosed in this application I have sacrificed in the interest of simplicity some of the accuracy obtained in the methods disclosed in my aforesaid applications so far as the length of the collar is concerned. However, such length variations can be kept from becoming seriously large with due care in manufacture and variations in the transverse dimensions can be greatly reduced as compared with the results obtained by conventional methods. More particularly such considerations may be illustrated by noting that under the best factory conditions the length of a completed collar will vary as much as plus or minus 3/16 or 1/4 inch. The variations in the transverse dimensions will not be substantially less than these figures in the finished collar if the collar is made in one piece and in fact such variations in transverse dimensions have been found to be so large in practice as to practically "kill" the one-piece collar. Accordingly it is seen that by far the most important errors to be overcome in the manufacture of one-piece collars are the errors in the transverse direction. The method and apparatus of this invention is especially adapted for minimizing such errors in the transverse direction and enables one-piece collars to be manufactured with adequate commercial accuracy while simplifying the special apparatus required.

One form of apparatus for producing either or both of the creases 4 and 5 in accurate location relative to the contours of the assembly as essentially determined by the running stitch is shown in Figs. 5 and 6. Fig. 5 shows a plan view of gauging and creasing means wherein the gauging means is adapted for gauging a run and turned assembly along the external contours thereof. Fixed to the metal plate 9 are the upstanding gauging strips 12 which present gauging surfaces to which may be conformed the external contours of the foldover portion of the collar along the running stitch. Also upstanding from the plate 9 are the crease-forming edges 14 and 15 which are fixed thereto in accurately spaced relation with respect to the gauging surfaces presented by the gauging strips 12. The crease-forming edges 14 and 15 are adapted to produce the creases 4 and 5 respectively which are shown in Figs. 2, 3, 4 and 4A. Pins 13 may be employed on which to impale the foldover portion of the collar when inserting the collar in the gauging means provided by the gauging strips 12. These pins serve to minimize any shifting of the collar after it has been gauged.

The gauging and crease-forming means shown in Fig. 5 may be employed in a press as illustrated in Fig. 6. The press shown in Fig. 6 is a conventional type of press comprising a base 21, a lower buck 22 and an upper buck 23 carried by the arm 24, the arm 24 being pivoted relative to the base 21 at 25. The press used may be of any conventional commercial construction well known in the industry and, therefore, need not be further described. The upper buck may be elevated or lowered either by hand or by suitable means not shown. Projecting from the upper buck 23 is a block 26 on the face of which is carried a strip 27 of resilient yieldable material such as rubber. When the press is closed the rubber strip is pressed against the crease-forming edges 14 and 15 thereby forming creases in the collar in accurately predetermined location. It will be understood that the bucks 22 and 23 are preferably heated so as to facilitate the formation of well defined creases.

The apparatus shown in Figs. 5 and 6 is adapted to form both of the creases 4 and 5 simultaneously and this constitutes the preferred practice of this invention. However, if the crease-forming edge 15 is omitted the apparatus may be used in forming only the crease 4 for use as a fiducial line to be used in attaching the preformed strip of foldine-forming material as hereinabove described. On the other hand by omitting the crease-forming edge 14 only the crease 5 would be formed which would be available for use as a fiducial line in accurately shaping and locating the bottom edge of the collarband of the finished collar. Moreover, the creases 4 and 5 could be formed sequentially, but if both creases are formed they can be positioned with greater accuracy when produced simultaneously. The foregoing considerations are also applicable to the other forms of apparatus for gauging and crease formation which will be described below.

The apparatus shown in Figs. 5 and 6 is as aforesaid appropriate for external gauging, namely, gauging according to the external contours of the run and turned assembly along the running stitch. In Figs. 7 and 8 I have shown an alternative type of apparatus which is suitable for employing internal gauging, namely, gauging according to internal contours of the run and turned assembly along the running stitch. In Fig. 7 there is shown a plate 31 which carries attached thereto the crease-forming edges 14 and 15 which are like the crease-forming edges indicated by the same reference characters in Figs. 5 and 6. In this case the gauging is obtained by pulling the run and turned assembly 10 shown in dotted lines in Fig. 7 over the plate 31 until the outer gauging edge which provides the gauging surface of the plate 31 conforms to the inner contour of the run and turned assembly along the running stitch. In this way the run and turned assembly is accurately gauged in relation to the crease-forming edges 14 and 15 which are in predetermined spaced relation with respect to the outer gauging edge of the plate 31. The outer gauging edge of the plate 31 is shaped so as to conform with the long contour of the foldover portion of the collar as shown. The gauging and crease-forming means shown in Fig. 7 may be used with a conventional collar press such as that indicated diagrammatically in Fig. 8 which comprises a lower buck 22 and an upper buck 23 as above described in connection with Fig. 6. Preferably the plate 31 is mounted so that it can be pivoted about the axis 32 as shown in Fig. 8 so that it may be swung into the vertical position shown in dotted lines for facilitating the placing of the run and turned assembly in gauged relation with the plate 31 and the removal of the assembly from the plate after the creases have been formed therein. While it is preferable to pivotally mount the plate 31, the plate 31 could, if desired, be entirely free of the collar press and merely inserted therein by hand. In Fig. 8 the crease-forming edges 14 and 15 are shown downwardly directed instead of upwardly directed as in Fig. 6 and in such case it is desirable to provide the lower buck 22 with an upper surface layer 22A of yieldable resilient material such as rubber. However, it is apparent that the plate 31 shown in Fig. 8 and the collar plies as disposed thereon could be inverted, and the buck surface of yieldable resilient material in such case would be comprised in the upper buck 23. Such inversion is shown in connection with Fig. 9 which, as will be described below, is illustrative of an alternative method of forming the creases by internal gauging.

In connection with Figs. 5 to 8 the gauging of the run assembly is shown as accomplished after the run assembly has been turned. Fig. 9 is illustrative of the practice of this invention by gauging the run assembly prior to turning. Moreover, the practice of this invention in connection with the apparatus shown in Fig. 9 is illustrative of a variation of this invention as regards a different positioning of the fiducial crease which is used for locating the strip of foldline-forming material in the collar assembly. In Fig. 10 the run and still unturned assembly is shown after the creases have been formed therein and with a different type of foldine-forming strip attached thereto. Fig. 11 shows the relationship of the plies and the strip of foldine-forming material after the assembly has been turned.

In Figs. 9, 10 and 11 the plies of the collar comprising the face ply 1, the lining ply 2 and the back ply 3 are the same as hereinabove described in connection with Figs. 1 to 4A. It is to be noted that in the assembly prior to turning the lining ply 2 is on top. The plies as before are stitched together along and adjacent at least the margin thereof which constitutes the foldover portion of the collar by the running stitch 8. The gauging means used is generally similar to that shown in Figs. 7 and 8 and comprises the plate 31 which may be mounted so as to be pivoted at 32 with reference to the lower buck 22 as above described in connection with Fig. 8. By pulling the run assembly prior to turning over the plate 31 the gauging surface presented by the outer edge of the plate 31 may be caused to conform to the inner contour of the margin of the foldover portion of the run assembly along the running stitch. The run assembly can, therefore, be gauged relative to the crease-forming edges which project from the surface of the plate 31. The crease-forming edge 15 is located with reference to the plate 31 for forming the crease along and adjacent the bottom edge of the band portion of the run assembly as hereinabove described. However, instead of employing the other crease-forming edge so as to form a crease substantially spaced from the desired location of the foldline a crease-forming edge 14a is used which is disposed along the intended location of the foldline F in the finished collar. In the particular apparatus shown in Fig. 9 the crease-forming edges 14a and 15 are directed upwardly and in such case the upper buck 23 is provided with a surface of yieldable resilient material 23a such as rubber. Upon pressing the gauged assembly between the bucks the crease-forming edge 15 forms a crease 5 as shown in Fig. 10 and the crease-forming edge 14a forms the crease 4a as is also shown in Fig. 10.

The strip of crease-forming material which is shown in Fig. 10 may be composed uniformly throughout of some stiffening material such as a fabric presenting latent activatable adhesive material on one or both surfaces thereof. Using such a preformed strip of crease-forming material the strip may be disposed on the upper surface of the lining ply 2 with an edge thereof disposed along the fiducial crease 4a as shown in Fig. 10. The strip may then be secured in position by the stitching 7a. Upon turning the assembly the lining ply 2 will be brought to the inside with the strip 6a attached thereto as shown in Fig. 11. Since according to the practice of this invention exemplified in connection with Figs. 9, 10 and 11 the foldline-forming strip 6a has one edge thereof disposed along the fiducial crease 4a which has been accurately positioned at the desired location of the foldline it is apparent that the strip 6a will provide desired discontinuity of stiffness along the foldline in accurately spaced relation with respect to the contours of the foldover portion of the collar. Such construction can be used either in a collar of the fused type or in a soft collar. Of course, the fiducial crease 5 may be used for forming the bottom edge of the collarband portion of the finished collar in accurate location as hereinabove described and as has been shown for purposes of illustration in Fig. 4a.

If desired apparatus of the type shown in Fig. 9 may be modified so as to form the fiducial crease for determining the location of the strip of foldline-forming material in a position corresponding to that of the crease 4 shown in Figs. 2 and 3. Conversely the apparatus shown in Figs. 5 to 8 may be modified so as to form this fiducial crease in the position of the crease 4a shown in Figs. 10 and 11. In any such case the strip of foldline-forming material can be accurately disposed using the crease as a fiducial mark for the purposes hereinabove described.

When the apparatus shown in Figs. 5 and 6 is used the crease 4 is formed in all of the plies of the assembly and the crease 5 is formed in both the face ply and the back ply. When, however, the apparatus shown in any of Figs. 7 to 9 is used the crease 4 or 4a is formed in only the lining ply and the face ply while the crease 5 is formed only in the face ply. Depending on the gauging means used and its disposition in relation to the run assembly the creases can be formed in other relationships to the plies of the assembly so as to accomplish the purposes aforesaid. While the strip of foldline-forming material may be attached so as to make it an integral part of the assembly after it has been accurately located with reference to the fiducial crease 4 or 4a by means of stitching, the strip may be attached in other ways. For example, in the case of a fused collar a slight moistening of the strip with a solvent for latent activatable adhesive comprised either in the strip or in the ply on which it is deposited will serve to accomplish temporary adhesion and particularly when the finished collar is of the fused type the foldline-forming strip will become a permanent part of the collar after the fusion operation.

One of the significant aspects of my present invention is that operations for locating the foldline-forming material in the finished collar are divided into two steps. The first step is the formation of a fiducial crease in accurately predetermined spaced relationship with respect to contours of a run collar assembly along the running stitch. This step is followed by a separate step whereby a preformed strip of foldline-forming material is positioned in the collar assembly in accurately located position using the crease formed in the first step as a fiducial line. In this way the apparatus requirements can be simplified while maintaining a high degree of accuracy by utilizing method steps which have the advantage of being readily adaptable to conventional methods of collar manufacture with which the art has long been familiar. Moreover, a further advantage of this step-wise method is that simultaneously with the formation of the crease which is produced in the second step as a fiducial line for accurately locating the preformed strip of foldline material, a second crease may likewise be produced which is adapted to serve as a fiducial crease for accurately determining the location of the bottom edge of the band portion of the finished collar.

While specific embodiments and method steps have been described hereinabove and while specific apparatus has been shown it is to be understood that this has been done for illustrative purposes and that the practice of this invention may be varied according to the principles thereof as hereinabove described.

I claim:

1. In a method of making from a plurality of fabric collar plies a one-piece collar having a foldover portion and a band portion with a foldline between said portions, the steps comprising assembling the component collar plies, running the assembled plies to stitch said plies together along and adjacent the margin thereof which constitutes at least said foldover portion of the collar, disposing the run assembly with the contour of the run portion of the assembly as essentially determined by the running stitch in positionally conformed gauged relation with respect to gauging surface of a gauging member, pressing at least one ply of the run assembly while it is maintained in the position determined by said gauging between a pressing member and a crease forming edge disposed in predetermined spaced relation to said gauging surface to form a longitudinally extending crease in said ply, and attaching to said ply a preformed strip of foldline-forming material with an edge thereof disposed along said crease, said strip when so disposed being adapted to provide discontinuity of stiffness in the finished collar for determining the location of the foldline between said foldover and band portions of the collar, whereby said strip is accurately located so that in the finished collar the foldline determined by said strip is in desired predetermined spaced relation with respect to the contours of the foldover portion of the collar.

2. In a method of making from a plurality of fabric collar plies a one-piece collar having a foldline portion and a band portion with a foldline between said portions, the steps comprising assembling the component collar plies, running the assembled plies to stitch them together along and adjacent the margin of the portion thereof which constitutes at least the foldover portion of the collar, disposing the run assembly with the contour of the run portion of the assembly as essentially determined by the running stitch in positionally conformed gauged relation with respect to gauging surface of a gauging member, pressing at least one ply of the run assembly while it is maintained in the position determined by said gauging between a pressing member and a first crease-forming edge disposed in predetermined spaced relation to said gauging surface to form a first longitudinally extending crease in said ply, pressing at least one ply of the run assembly while said assembly is maintained in gauged position as aforesaid between a pressing member and a second crease forming edge in predetermined spaced relation to said gauging surface to form a second longitudinally extending crease disposed along and adjacent the bottom of the band portion of the assembly, attaching to said ply in which said first crease has been formed a preformed strip of foldline-forming material with an edge thereof disposed along said first crease, said strip when so disposed being adapted to provide discontinuity of stiffness in the finished collar for determining the location of the foldline between the foldover and band portions of the collar, and forming the bottom edge of said band portion so as to fall along said second crease, whereby said strip is located so that in the finished collar the foldline determined by said strip is in desired predetermined spaced relation with respect to the contour of the foldover portion of the collar and with respect to the bottom edge of the band portion of the collar.

3. In a method of making from a plurality of fabric plies a one-piece collar having a foldover portion and a band portion, the steps comprising assembling the component collar plies, running the assembled plies to stitch them together along and adjacent the margin of the portion thereof which constitutes at least the foldover portion of the collar, disposing the run assembly with the contour of the run portion of the assembly as essentially determined by the running stitch in positionally conformed gauged relation with respect to gauging surface of a gauging member, pressing at least one ply of the run assembly while it is maintained in the position determined by said gauging between a pressing member and a crease-forming edge disposed in predetermined spaced relation relative to said gauging surface to form a longitudinally extending crease in said ply along and adjacent the bottom of said band portion of the assembly, and thereafter forming the bottom edge of said band portion so as to fall along said crease.

4. In a method of making a one-piece collar having a foldover portion and a band portion with a foldline therebetween and comprising a front ply, a lining ply and a back ply, the steps comprising assembling the component collar plies with said lining ply on the outside of the assembly, running the assembled plies to stitch them together along and adjacent the portion thereof which constitutes at least the foldover portion of the collar, turning the run assembly with flexure of the plies along and adjacent the running stitch, thereby bringing the lining ply between the other two plies, disposing the run and turned assembly with the contour of the foldover portion of the run and turned assembly as essentially determined by the running stitch in positionally conformed gauged relation with respect to gauging surface of a gauging member, pressing at least said lining ply of the run and turned assembly while it is maintained in the position determined by said gauging between a pressing member and a crease-forming edge disposed in predetermined spaced relation relative to said gauging surface to form a longitudinally extending crease in said lining ply in the region of said collarband portion and substantially spaced from the desired location of the foldline between the foldover and band portions of the collar, attaching to said lining ply for disposition between said lining ply and an adjacent ply a preformed fabric strip with one edge thereof disposed along said crease in said lining ply, said strip being adapted along and adjacent the other edge thereof to provide discontinuity of stiffness in the finished collar and the width of said strip being such that when so positioned said discontinuity of stiffness falls along the desired location of the foldline between the foldover and band portions of the collar, whereby said strip is accurately located so that in the finished collar the foldline determined by said strip is in desired predetermined spaced relation with respect to the contour of the foldover portion of the collar.

5. In a method of making a one-piece collar according to claim 4, the combination with the steps recited in said claim of the further step of pressing at least one ply of the run and turned assembly while it is in the position determined by said gauging between a pressing member and a second crease-forming edge disposed in predetermined spaced relation relative to said gauging surface to form a crease in said ply disposed along and adjacent the bottom of said band portion.

6. In a method of making a one-piece collar having a foldover portion and a band portion with a foldline therebetween and comprising a face ply, a lining ply and a back ply, the steps comprising assembling the component collar plies with said lining ply on the outside of the assembly, running the assembled plies to stitch them together along and adjacent the portion thereof which constitutes at least the foldover portion of the collar, gauging the run assembly by inserting between plies thereof a gauging member presenting gauging surface adapted to coact with the inner contours of the run assembly in the foldover portion thereof as determined by the running stitch, pressing at least said lining ply of the assembly while it is maintained in the position determined by said gauging between a pressing member and a crease-forming edge disposed in predetermined spaced relation to said gauging surface of said gauging member to form a crease therein, attaching to said lining ply a strip of foldline-forming material with an edge thereof disposed along said crease, said strip when so disposed being adapted to provide discontinuity of stiffness in the finished collar for determining the location of the foldline between said foldover and band portions of the collar, and turning the assembly with flexure of the collar plies along said running stitch to bring said lining ply between the other two with said strip between said lining ply and one of the other plies, whereby said strip is accurately located so that in the finished collar the foldline determined by said strip is in desired predetermined spaced relation with respect to the contour of the foldover portion of the collar.

7. In a method of making a one-piece collar according to claim 6, the combination with the steps recited in said claim of the further step of pressing at least one ply of the run assembly while it is in the position determined by said gauging between a pressing member and a second crease forming edge disposed in predetermined spaced relation to said gauging surface to form a crease in said ply disposed along and adjacent the bottom of said band portion.

8. In a method of making from a plurality of fabric collar plies a one-piece collar having a foldover portion and a band portion, the attachment thereof of a fabric piece in predetermined location by the steps comprising assembling the component collar plies, running the assembled plies to stitch said plies together along and adjacent the margin of the portion thereof which constitutes at least the foldover portion of the collar disposing the run assembly with the contour of the run portion of the assembly as essentially determined by the running stitch in positionally conformed gauged relation with respect to gauging surface of a gauging member, pressing at least one ply of the run assembly while it is maintained in the position determined by said gauging between a pressing member and a crease forming edge disposed in predetermined spaced relation relative to said gauging surface of said gauging means to form a crease in said ply, and attaching said fabric piece to said ply in position relative thereto determined by said crease, whereby said fabric piece is accurately located so that in the finished collar it is in predetermined spaced relation relative to the contours of the foldover portion thereof.

References Cited in the file of this patent

UNITED STATES PATENTS

| Number | Name | Date |
|---|---|---|
| 184,891 | Norton | Nov. 28, 1876 |
| 232,296 | Pine | Sept. 14, 1880 |
| 234,571 | Hermann | Nov. 16, 1880 |
| 2,639,841 | Liebowitz | May 26, 1953 |
| 2,639,842 | Liebowitz | May 26, 1953 |
| 2,639,843 | Liebowitz | May 26, 1953 |